Patented Dec. 5, 1950

2,532,573

UNITED STATES PATENT OFFICE 2,532,573

PROCESS FOR PREPARING VINYLTHIAZOLES

Leroy Frank Salisbury, Wilmington, Del., assignor to E. I. du Pont de Nemours & Company, Wilmington, Del., a corporation of Delaware No Drawing. Application June 19, 1946, Serial No. 677,919

11 Claims. (Cl. 260—302)

This invention relates to vinylthiazoles and to their preparation. More particularly this invention relates to new vinylthiazoles and to polymers and copolymers thereof.

It is an object of this invention to provide a new method for the preparation of vinylthiazoles. A further object of this invention is to make available new and useful compositions of matter. A still further object is to provide new vinylthiazoles. An important object is to provide new polymers and copolymers. Another object is to provide vinylthiazoles which can be polymerized alone to form polymers and with other polymeric substances to form copolymers. Other objects will appear hereinafter.

These objects are accomplished by the invention of the new chemical compounds, the 2-vinylthiazoles, particularly 2-vinyl-4-methylthiazole, their polymers and copolymers with other polymerizable compounds, and processes for their preparation. It has now been discovered that a beta-thiazolylethanol can be dehydrated to a vinylthiazole by a process which comprises bringing the beta-thiazolylethanol in contact with an alkali metal hydroxide catalyst at a temperature in excess of 130° C. and at a subatmospheric pressure below the vapor pressure of the corresponding vinylthiazole produced by the dehydration and removing the vinylthiazole from the catalyst by distillation. It is preferable to introduce the beta-thiazolylethanol into contact with the alkali metal hydroxide catalyst at such a rate as to prevent an accumulation of liquid on the catalyst. This controlled addition rate of the beta-thiazolylethanol can be continuous and is in general, equivalent to the rate at which the vinylthiazole is removed from the catalyst chamber by distillation. It is preferable that the vinylthiazole and water that is produced be distilled from the reaction vessel as rapidly as formed and the vinylthiazole can be condensed and collected in a receiver.

The reaction for the preparation of the new 2-vinylthiazoles of this invention can be illustrated by the preparation of 2-vinyl-4-methylthiazole in accordance with the following equation in which 2-(beta-hydroxyethyl)-4-methylthiazole is dehydrated by contact with potassium hydroxide at a temperature in excess of 130° C. and at a subatmospheric pressure below the vapor pressure of the corresponding vinylthiazole formed in the dehydration process.

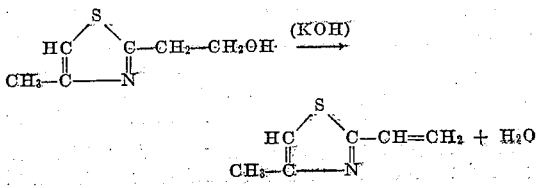

By a beta-thiazolylethanol is meant an ethane in which a thiazolyl group and a hydroxyl group are attached to vicinal carbons. For the dehydration of the beta-thiazolylethanol the temperature should be at least 130° C. and in general not over 225° C. while a temperature between 160° C. and 200° C. is preferred as having been found to give optimum results. The reaction vessel can be heated by any suitable method, such as by a liquid transfer medium or by vapors of a boiling liquid selected for its boiling point in the desired temperature range.

The pressure employed for the dehydration of the beta-thiazolylethanol should be less than 100 mm. of mercury and is preferably within the range of from 10 to 30 mm. of mercury although pressures lower than 10 mm., for example 5 mm. of mercury can be employed.

The amount of alkali employed is not critical. It has been discovered that a small amount of normally solid alkali is sufficient for the conversion of a relatively large amount of thiazolylethanol to the vinylthiazole. Any alkali metal hydroxide or mixture containing at least one alkali metal hydroxide can be used as a catalyst, for example sodium or potassium hydroxide. Potassium hydroxide is favored because it is molten in the preferred 160° to 200° C. reaction temperature range and hence continually presents a new surface to the thiazolylethanol. Since the dehydration occurs chiefly at the surface of the alkali metal hydroxide, it is sufficient to have a layer of molten alkali metal hydroxide ¼ inch to ½ inch deep and as great in area as convenient.

The rate of addition of the thiazolylethanol to the alkali should be substantially equivalent to the rate of distillation for removal of the product of dehydration (water and vinylthiazole). An excess of liquid on the catalyst should be avoided to obtain the optimum yield. In general, the presence of an amount of liquid in excess of the amount of catalyst should be avoided.

The polymerization or copolymerization of the vinylthiazole can be carried out by means of heat or ultraviolet light. Preferably, one of the usual polymerization catalysts is used, such as the organic peroxides as for example, benzoyl peroxide and diethyl peroxide, or the persulfates and the sulfites, or the ferricyanides. The persulfates are generally preferred for use in aqueous systems and may be blended, for example with the sulfites. Polymerization and copolymerization can be carried out in organic solvents or diluents, for example benzene, acetone, methanol and the like, in aqueous emulsions, or in bulk. The usual emulsifying agents include the alkali metal and triethanolamine salts of the higher aliphatic acids, for example lauric, palmitic, stearic, oleic and the like, the alkali metal salts of the sulfuric acid esters of lauryl, myristyl, or other higher alcohols, and the quaternary ammonium salts, for example cetyl trimethyl-ammonium bromide.

The temperature at which polymerization and copolymerization is carried out can vary within the range 0° to 100° C., but preferably a range of 20° to 60° C. is employed. The time required for polymerization and copolymerization is dependent upon the conditions used and can vary from a few minutes to several days, being longer at the lower temperatures.

The 2-vinylthiazoles of this invention for example 2-vinyl-4-ethylthiazole, 2-vinyl-4-butylthiazole and 2-vinyl-5-propylthiazole, are polymerizable per se to polymers which vary, depending upon the nature of the monomer and degree of polymerization, from viscous liquids to waxy solids. These vinylthiazoles are also polymerizable with other polymerizable compounds including styrene, the acrylyl compounds, for example acrylic acid, acrylonitrile, acrylic esters such as ethyl acrylate; methacrylyl compounds, for example methacrylic acid, methyl methacrylate, methacrylamide; and conjugated dienes, for example, isoprene, and the like.

The copolymers may contain any desired amount of the vinylthiazole, for example, between 2% and 95%, although at least 5% is required for a significant improvement in physical properties. Preferably there should be at least 50% of the other comonomer to retain its properties in the copolymer. Hence a range between 5% and 50% of the vinylthiazole is preferred.

This invention is further illustrated by the following examples in which parts are given by weight, unless otherwise specified.

Example I

Into a vessel to which was attached a water-cooled condenser with receiver was placed approximately 30 parts of potassium hydroxide pellets. The vessel, condenser and receiver were evacuated and maintained at approximately 20–30 mm. of mercury pressure and the vessel heated in a molten-metal bath maintained at a temperature of 180–200° C. A total of 35 parts of 2-(4-methylthiazolyl)ethanol [2-(beta-hydroxyethyl)-4-methylthiazole] was added dropwise to the potassium hydroxide pellets. The 2-vinyl-4-methylthiazole and water which were produced distilled from the reaction vessel as rapidly as formed and were condensed and collected in the receiver. This distillate was dried with anhydrous potassium carbonate and then redistilled to give 23 parts of colorless, oily 2-vinyl-4-methylthiazole boiling at 61–62° C./12 mm.; $n_D^{25}$=1.5545.

Example II

Using the general procedure of Example I, similar results were obtained by contacting the 2-(4-methylthiazolyl)-ethanol with solid sodium hydroxide with the reaction vessel heated at 200° C. and evacuated to approximately 15 mm. mercury pressure.

Catalytic hydrogenation of the vinylthiazole (b. p. 61–62° C./12 mm.) of Example I resulted in 2-ethyl-4-methylthiazole boiling at 162° C./760 mm.; $n_D^{25}$=1.5021. This corresponds to a boiling point of 160.6–161° C./728.5 mm. for 2-methyl-4-ethylthiazole reported by the Hubacher, Ann. 259, 230 (1890) whereas the boiling point of 4-ethyl-2-methylthiazole is given as 169–171° C./719 mm. as reported by Rublew, Ann. 259, 263 (1890).

Example III

A mixture of 39 parts of copper-free distilled water, 0.16 part of oleic acid, 0.044 part of sodium hydroxide, 3.9 parts of 2-vinyl-4-methylthiazole, 0.04 part of potassium persulfate, and 0.013 part of sodium sulfite is blanketed with nitrogen in a glass reactor. The reactor is sealed, and shaken at 40° C. for 22 hours. The latex so obtained is coagulated with saturated aqueous sodium chloride solution, filtered, and washed with water. A dry sample of the resulting polymer is found to contain 11.1% of nitrogen as compared to a calculated value of 11.2% for this element in ($C_6H_7NS$). The product is a colorless, granular solid which can be molded to clear, tough films, and softens at about 90° C. It is soluble in toluene, methanol, chloroform, and N/10 hydrochloric acid, but insoluble in acetone.

Example IV

The 2-vinyl-4-methylthiazole of this invention was copolymerized with butadiene in the following manner. A mixture of 90 parts of copper-free distilled water, 1.6 parts of oleic acid, 0.44 part of sodium hydroxide, 0.4 part of Daxad 11 (a commercial dispersing and colloid agent which is a condensation product of formaldehyde with sodium beta-naphthalene sulfonate), 0.4 part of potassium persulfate, 0.13 part sodium sulfite, 34 parts butadiene, and 6 parts of 2-vinyl-4-methylthiazole prepared in accordance with the procedure described in Example I was placed in a glass reactor, blanketed with nitrogen, sealed, and rocked at 25° C. for 24 hours. The excess butadiene and residual vinylthiazole monomer were removed by evaporation and blowing with steam. The resulting latex was then coagulated with brine, washed with water on a corrugated rubber mill and dried on a smooth mill at 50–60° C. During this drying operation on the smooth mill, $\frac{1}{16}$ part of Neozone D (phenyl beta-naphthylamine, used as a rubber antioxidant) was incorporated. By this procedure 20 parts of dry polymer was obtained which contained 6.31% sulfur which corresponds to a 2-vinyl-4-methylthiazole content of 24%.

The latex referred to above was tested as an adhesive in the following manner and when thus formulated exhibited excellent properties for bonding tire cord to rubber. To 210 parts of the butadiene/2-vinyl-4-methylthiazole latex, as described in Example IV, is added with agitation a resorcinol/formaldehyde solution prepared by dissolving at 25° C. seven parts of resorcinol, 3.5 parts of 37% aqueous formaldehyde solution, in 100 parts of water and alkalizing with 0.35 part of sodium hydroxide. The resulting blend is allowed to stand at room temperature for two hours and then applied to a strip of square woven nylon fabric one inch wide and five inches long. The fabric is dried for ten minutes at 135° C. and placed, adhesive side down, on an unvulcanized but compounded rubber stock having the following composition:

|  | Parts |
|---|---|
| Smoked sheet | 100 |
| Zinc oxide | 50 |
| Phenyl-beta-naphthalamine | 1.50 |
| Sulfur | 2.75 |
| Stearic acid | 2.00 |
| Pine tar | 2.80 |
| Mercaptobenzothiazole | 0.75 |

The composite is placed in a mold and heated to 140° to 145° C. until the rubber is vulcanized and the adhesive is heat converted. The composite is then removed from the mold, cooled and the bond strength determined by measuring the pull in pounds necessary to separate the fabric and the rubber. As a basis for comparison there was also tested the ability to adhere nylon tire cord to rubber of a blend of GR—S latex with the resorcinol/formaldehyde resol. GR—S latex is a commercial synthetic rubber composed approximately of a 75%-25% butadiene/styrene interpolymer prepared in accordance with U. S. Patent 1,938,731 issued December 12, 1933.

The blend of GR—S latex gave test bonds between rubber and nylon of about 5 to 6 lbs./in. at 25° C. as compared to 18 lbs./in. at 25° C. for the above butadiene/2-vinyl-4-methyl-thiazole latex of this invention. Similar tests with unmodified polybutadiene show 8 lbs./in.

Example V

The dry, smooth-milled rubber obtained in accordance with the procedure of the previous example was compounded by milling on cold tight rolls, breaking the rubber down to a smooth band on the mill and then adding the following listed ingredients in the order given below.

(a) 8 parts of the rubber from Example IV
0.16 part sulfur
0.16 part stearic acid
0.4 part zinc oxide
0.1 part 2-mercaptobenzothiazole accelerator (b) 6.65 parts of the rubber from Example IV
0.13 part sulfur
3.3 parts Micronex (a semi-reinforcing carbon black of medium particle size)
0.13 part stearic acid
0.33 part zinc oxide
0.08 part 2-mercaptobenzothiazole accelerator These elastomeric compositions, (a) and (b), were then cured at 140° C. for 30 minutes and the resultant vulcanizates were found to have the following properties:

Product (a): Tensile strength, 320 lb./sq. in.; elongation at break, 520%.
Product (b): Tensile strength, 1720 lb./sq. in.; elongation at break, 390%.

Although in the foregoing illustrative examples, specific conditions of temperature, pressure, reaction periods, reactants and reactant concentrations have been given, it is to be understood that these values are subject to considerable variation within the scope of this invention. The precise temperatures and pressures that are employed in dehydration of the thiazolylethanol are interdependent, that is a higher pressure will require a higher temperature for any specific thiazolylethanol employed. The temperature and pressure employed for optimum results are therefore those which will effect the distillation of the vinylthiazole rapidly but are not sufficiently high to distill the corresponding thiazolylethanol at an appreciable rate.

The beta-thiazolylethanols that can be employed in the process of this invention to produce 2-vinylthiazoles may also have as substituents, hydrocarbon groups, each if preferably not more than four carbon atoms, attached to the thiazole nucleus, such as for example 2-(4-methylthiazolyl)-ethanol. Examples of the preferred substitution hydrocarbon groups that can be present on the thiazole nucleus include methyl, ethyl, propyl and butyl. Also included in these hydrocarbon substituted thiazolylethanols are the benzothiazolylethanols, such as 2-benzothiazolylethanol. These aromatic hydrocarbon substituted thiazolylethanols have the thiazole attached to a benzene ring. Certain of the thiazolylethanols can be obtained by the reaction of formaldehyde upon a methyl-substituted thiazole, such as 2-methylthiazole, 2-methyl-4-ethylthiazole and the like.

The continuous process of this invention for the preparation of vinylthiazoles by the dehydration of beta-thiazolylethanols is especially advantageous commercially in view of the high yield which it affords and the economy resulting from decreased catalyst employment. In fact, the economy resulting from the use of a relatively small amount of alkali for the dehydration of a large amount of thiazolylethanol is one of the principal advantages of this invention.

The polymers and copolymers of the 2-vinylthiazoles and preferably the 2-vinyl-4-methylthiazole of this invention are useful as coating and impregnating agents particularly for texile materials, such as cotton and rayon fabrics. In these applications the polymers or copolymers can be used, or the monomer or comonomer mixtures can be polymerized in situ. The copolymers of the 2-vinylthiazoles and preferably the 2-vinyl-4-methylthiazole are also useful as bonding agents, for example as adhesives between tire cord and rubber. The monomeric 2-vinylthiazoles are also useful as insecticides and as pharmaceutical intermediates.

As many apparently widely different embodiments of this invention may be made without departing from the spirit and scope thereof, it is to be understood that I do not limit myself to the specific embodiments thereof except as defined in the appended claims.

I claim:

1. A process for preparing vinylthiazoles which comprises bringing a beta-thiazolylethanol in contact with an alkali metal hydroxide catalyst at a temperature between 130° C. and 225° C. and at a subatmospheric pressure below the vapor pressure of the vinylthiazole produced in said process, and removing said vinylthiazole from the catalyst by distillation.

2. A process for preparing vinylthiazoles which comprises bringing a beta-thiazolylethanol in contact with an alkali metal hydroxide catalyst at a temperature between 130° C. and 225° C. and at a subatmospheric pressure below the vapor pressure of the vinylthiazole produced in said process, removing said vinylthiazole from the catalyst by distillation, and continuously introducing additional beta-thiazolylethanol into contact with said catalyst substantially at the rate at which the vinylthiazole is distilled.

3. A process for preparing vinylthiazoles which comprises bringing a beta-thiazolylethanol having a hydrocarbon group attached to the thiazole nucleus in contact with an alkali metal hydroxide catalyst at a temperature between 130° and 225° C. and at a subatmospheric pressure of less than 100 mm. of mercury, and removing the vinylthiazole produced in said process from the catalyst by distillation.

4. A process for preparing vinylthiazoles which comprises bringing a beta-thiazolylethanol having an alkyl group attached to the thiazole nucleus in contact with an alkali metal hydroxide catalyst at a temperature between 160° and 200° C. and at a subatmospheric pressure between 5 mm. and 100 mm. of mercury, and removing the vinylthiazole produced in said process from the catalyst by distillation.

5. A process for preparing vinylthiazoles which comprises bringing a beta-thiazolylethanol having an alkyl group of not more than four carbon atoms attached to the thiazole nucleus in contact with an alkali metal hydroxide catalyst at a temperature between 160° and 200° C. and at a subatmospheric pressure between 10 mm. and 30 mm. of mercury, and removing the vinylthiazole produced in said process from the catalyst by distillation.

6. A process for preparing vinylthiazoles which comprises bringing a beta-thiazolylethanol in contact with a potassium hydroxide catalyst at a temperature between 130° C. and 225° C. and at a subatmospheric pressure below the vapor pressure of the vinylthiazole produced in said process, and removing said vinylthiazole from the catalyst by distillation.

7. A process for preparing vinylthiazoles which comprises bringing a beta-thiazolylethanol in contact with a sodium hydroxide catalyst at a temperature between 130° C. and 225° C. and at a subatmospheric pressure below the vapor pressure of the vinylthiazole produced in said process, and removing said vinylthiazole from the catalyst by distillation.

8. A process for preparing 2-vinyl-4-methylthiazole which comprises bringing 2-(beta-hydroxyethyl)-4-methylthiazole in contact with an alkali metal hydroxide catalyst at a temperature between 130° C. and 225° C. and at a subatmospheric presure below the vapor pressure of the 2-vinyl-4-methylthiazole produced in said process, and removing said 2-vinyl-4-methylthiazole from the catalyst by distillation.

9. A process for preparing 2-vinyl-4-methylthiazole which comprises bringing 2-(beta-hydroxyethyl)-4-methylthiazole in contact with an alkali metal hydroxide catalyst at a temperature between 130° and 225° C. and at a subatmospheric pressure of 5 mm. to 100 mm. of mercury, and removing the 2-vinyl-4-methylthiazole from the catalyst by distillation.

10. A process as set forth in claim 9 in which said catalyst is potassium hydroxide.

11. A process as set forth in claim 9 in which said catalyst is sodium hydroxide.

LEROY FRANK SALISBURY.

REFERENCES CITED

The following references are of record in the file of this patent:

FOREIGN PATENTS

| Number | Country | Date |
| --- | --- | --- |
| 478,989 | Great Britain | May 1937 |

OTHER REFERENCES

Chem. Abst., vol. 32, p. 7577 (1938) citing Comp. rend. soc. biol. 128, 238–241.